US012090992B2

(12) United States Patent
Bichkar et al.

(10) Patent No.: US 12,090,992 B2
(45) Date of Patent: Sep. 17, 2024

(54) DRIVELINE DISCONNECT CLUTCH OPERATING METHODS AND SYSTEM

(71) Applicant: Ford Global Technologies, LLC, Dearborn, MI (US)

(72) Inventors: Akshay Bichkar, Ann Arbor, MI (US); Jason Meyer, Canton, MI (US); Maruthi Ravichandran, Dearborn, MI (US); Ravikumar Tumu, Westland, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/476,217

(22) Filed: Sep. 27, 2023

(65) Prior Publication Data

US 2024/0017716 A1    Jan. 18, 2024

Related U.S. Application Data

(62) Division of application No. 17/643,754, filed on Dec. 10, 2021, now Pat. No. 11,807,219.

(51) Int. Cl.
*B60W 10/02* (2006.01)
*B60W 10/06* (2006.01)
*B60W 10/08* (2006.01)
*B60W 20/40* (2016.01)

(52) U.S. Cl.
CPC ............ *B60W 20/40* (2013.01); *B60W 10/02* (2013.01); *B60W 10/06* (2013.01); *B60W 10/08* (2013.01); *B60W 2510/0609* (2013.01); *B60W 2510/0638* (2013.01); *B60W 2510/081* (2013.01); *B60W 2510/083* (2013.01); *B60W 2540/10* (2013.01); *B60W 2710/021* (2013.01); *B60W 2710/027* (2013.01); *B60W 2710/06* (2013.01); *B60W 2710/08* (2013.01)

(58) Field of Classification Search
CPC ...... B60W 20/40; B60W 10/02; B60W 10/06; B60W 10/08; B60W 2510/0638; B60W 2510/081; B60W 2540/10; B60W 2710/021; B60W 2710/06; B60W 2710/08; B60W 1710/023; B60W 2710/027; B60W 2510/0609
USPC ................................................. 477/5; 701/67
See application file for complete search history.

(56) References Cited

U.S. PATENT DOCUMENTS

| 7,267,090 B2 | 9/2007 | Tamai et al. |
| 9,272,698 B2 | 3/2016 | Wang et al. |
| 10,543,832 B2 * | 1/2020 | Yamazaki ............. B60W 30/19 |
| 10,981,559 B2 | 4/2021 | Kim |

(Continued)

*Primary Examiner* — Roger L Pang
(74) *Attorney, Agent, or Firm* — David Kelley; McCoy Russell LLP (57) ABSTRACT

Systems and methods for operating a driveline of a hybrid vehicle are presented. In one example, a boost phase of a procedure to close a driveline disconnect clutch may be cut short in response to an engine changing state from not rotating to rotating so that the engine may be restarted in an alternative way. The system and methods may also predict a degraded engine start from a low engine cranking speed or a long cranking time duration so that the engine may be started in an alternative way to increase a possibility of starting the engine and decrease the severity of degraded driveline disturbance.

10 Claims, 5 Drawing Sheets

(56) References Cited

U.S. PATENT DOCUMENTS

| | | | |
|---|---|---|---|
| 2002/0170758 A1* | 11/2002 | Shimabukuro | B60W 10/08 903/918 |
| 2013/0038271 A1 | 2/2013 | Park | |
| 2013/0297161 A1 | 11/2013 | Gibson et al. | |
| 2015/0226171 A1 | 8/2015 | Kees et al. | |
| 2017/0259810 A1 | 9/2017 | Zhang et al. | |
| 2018/0119758 A1* | 5/2018 | Nedorezov | F16D 48/066 |
| 2018/0208202 A1* | 7/2018 | Kobayashi | B60K 6/547 |
| 2021/0086775 A1* | 3/2021 | Blue | B60W 10/08 |
| 2021/0129830 A1 | 5/2021 | Matsubara et al. | |
| 2022/0213856 A1* | 7/2022 | Baxendale | F02N 15/022 |

\* cited by examiner

DRIVELINE DISCONNECT CLUTCH OPERATING METHODS AND SYSTEM

CROSS REFERENCE TO RELATED APPLICATION

The present application is a divisional of U.S. Non-Provisional patent application Ser. No. 17/643,754, entitled "DRIVELINE DISCONNECT CLUTCH OPERATING METHODS AND SYSTEM", and filed on Dec. 10, 2021. The entire contents of the above-listed application are hereby incorporated by reference for all purposes.

FIELD

The present description relates to methods and a system for improving operation of a driveline disconnect clutch of a vehicle. The methods and system may be particularly useful for hybrid vehicles that include an engine, electric machine, and a driveline disconnect clutch.

BACKGROUND AND SUMMARY

A driveline disconnect clutch may be used to selectively couple and decouple an engine to an electric machine and a transmission. For example, the driveline disconnect clutch may be closed to start the engine. Conversely, the driveline disconnect clutch may be opened to conserve fuel. The electric machine may propel a vehicle when the driveline disconnect clutch is open. Whether the driveline disconnect clutch is open or closed may be a function of operating conditions such as driver demand torque/power, vehicle speed, battery state of charge, emissions device temperature, and engine temperature. The vehicle operating conditions may change quickly at times, and it may be desirable to change the driveline disconnect clutch operating state in accordance with the changing vehicle operating conditions. However, it may be difficult for the driveline disconnect clutch to repeatedly open and close without producing driveline torque disturbances.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
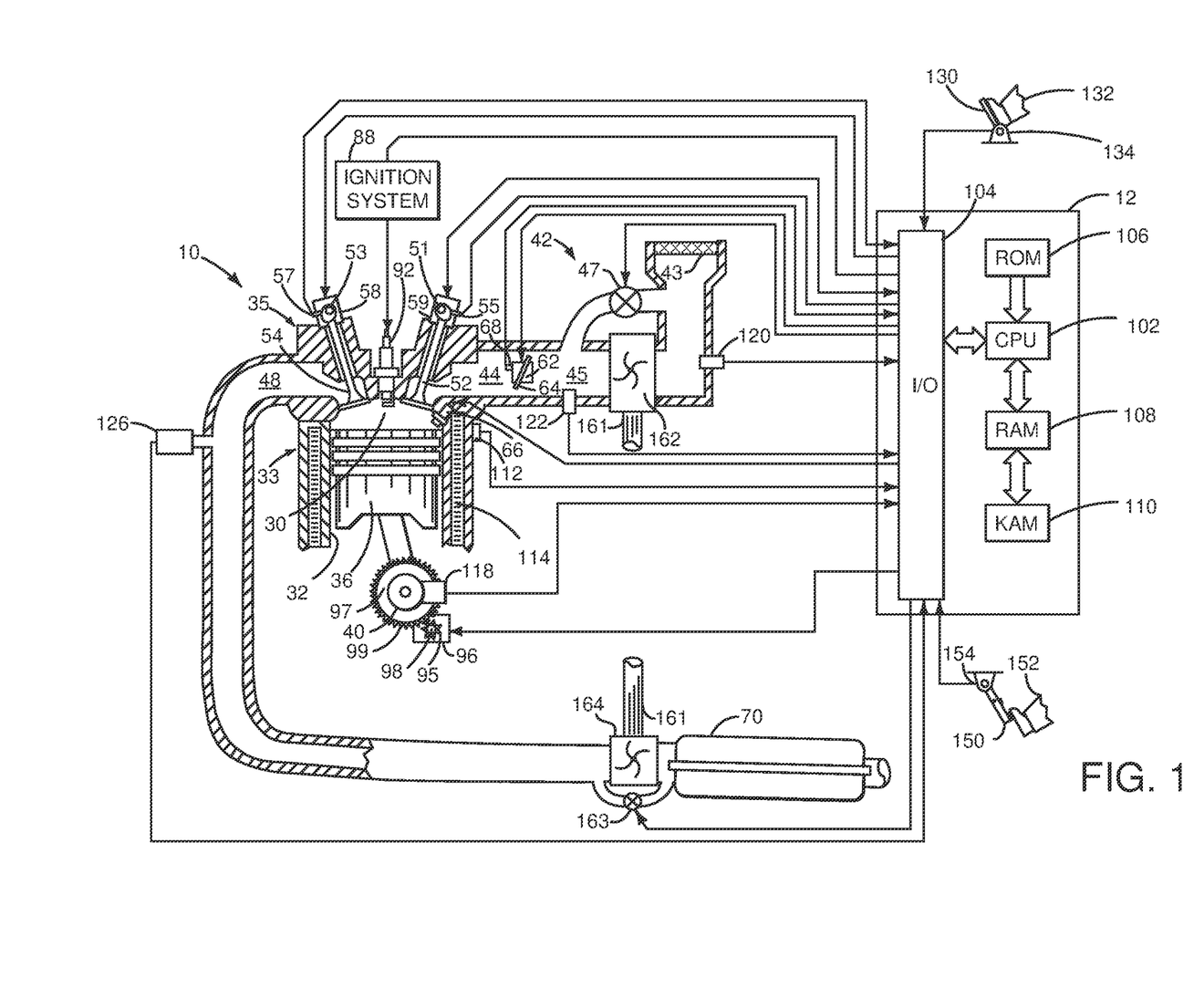
FIG. 1 is a schematic diagram of an engine.
Figure 2:
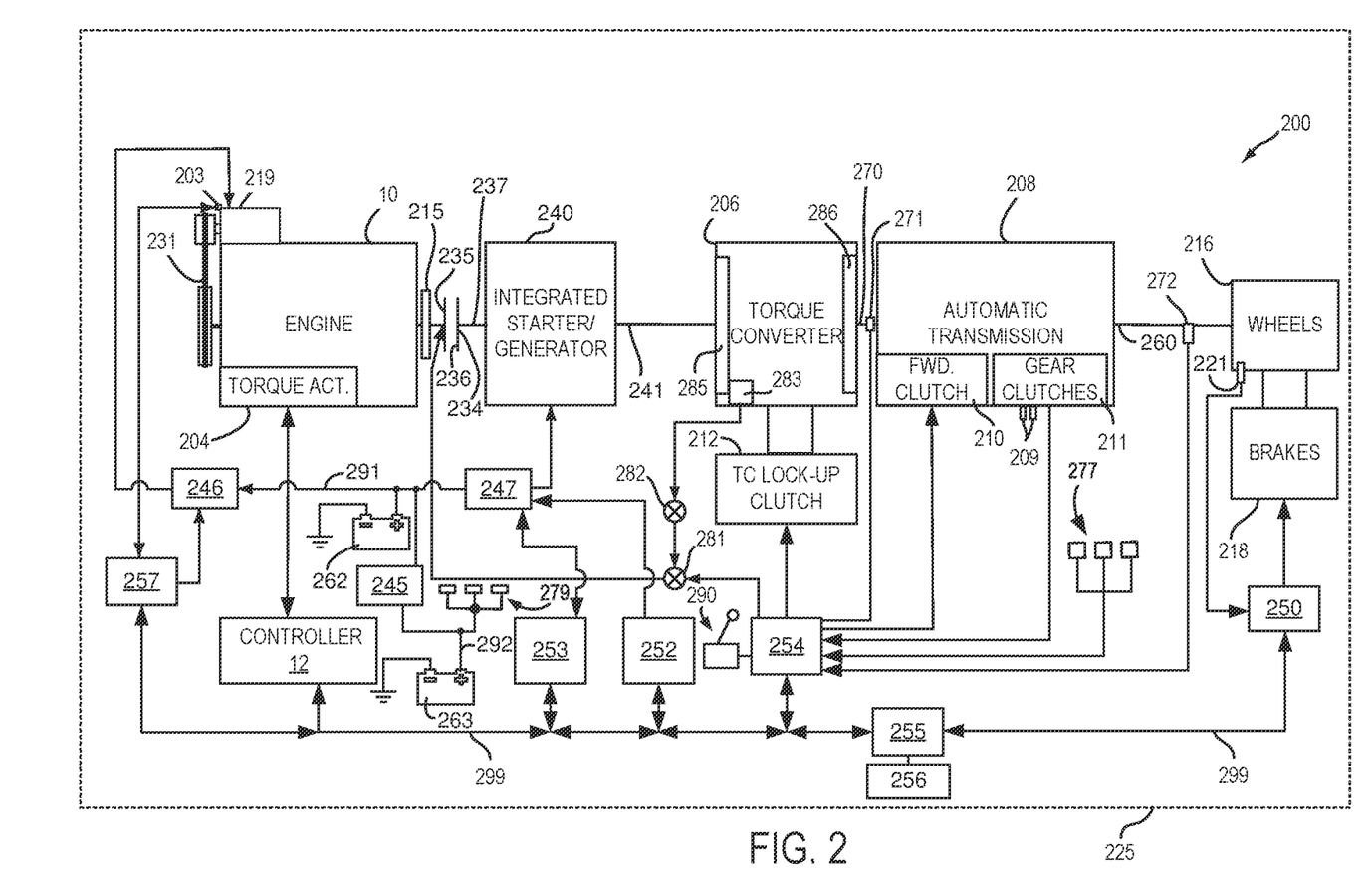
FIG. 2 is a schematic diagram of a hybrid vehicle driveline including the engine of FIG. 1.
Figure 3:
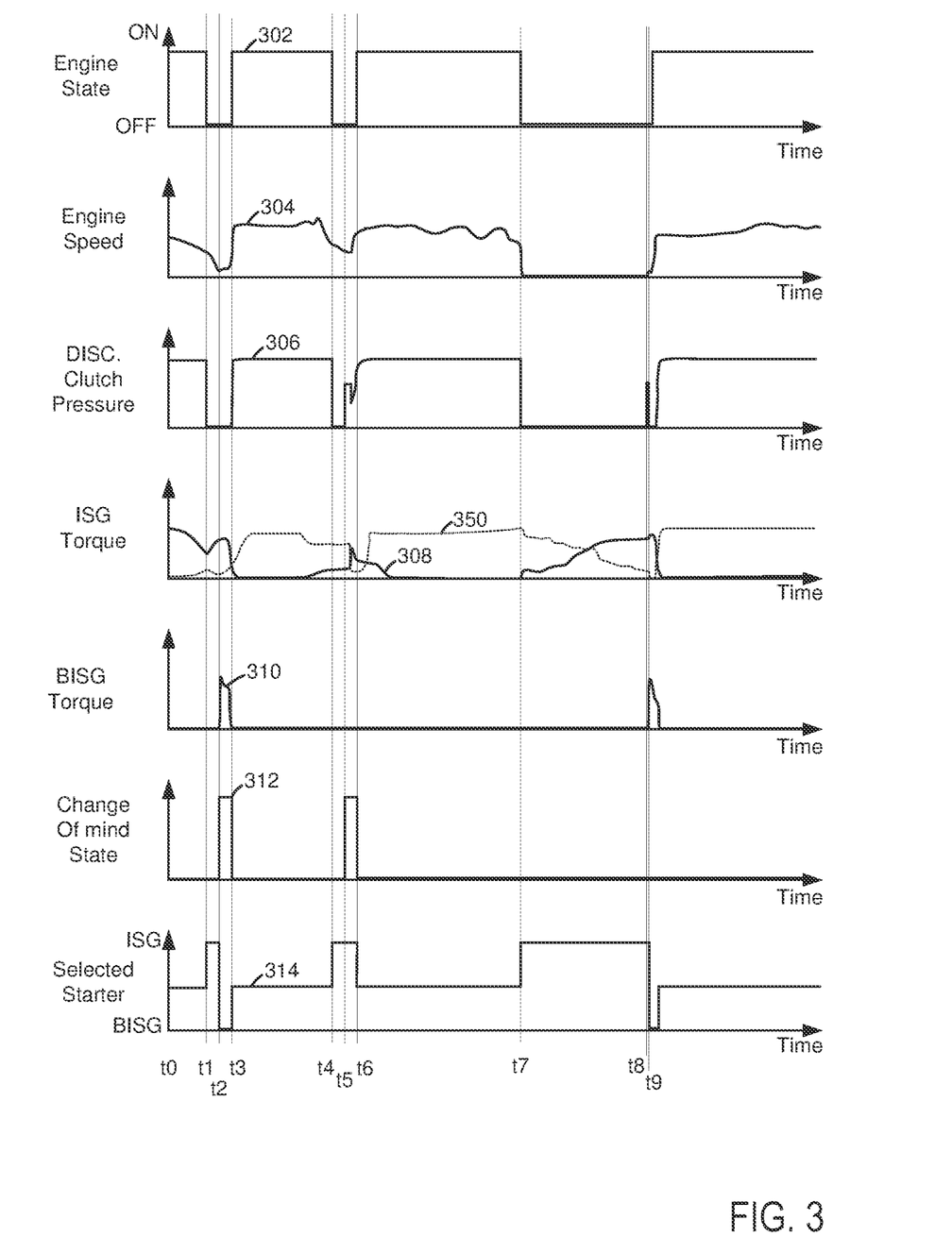
FIG. 3 is an example operating sequence for the hybrid vehicle driveline.
Figure 4:
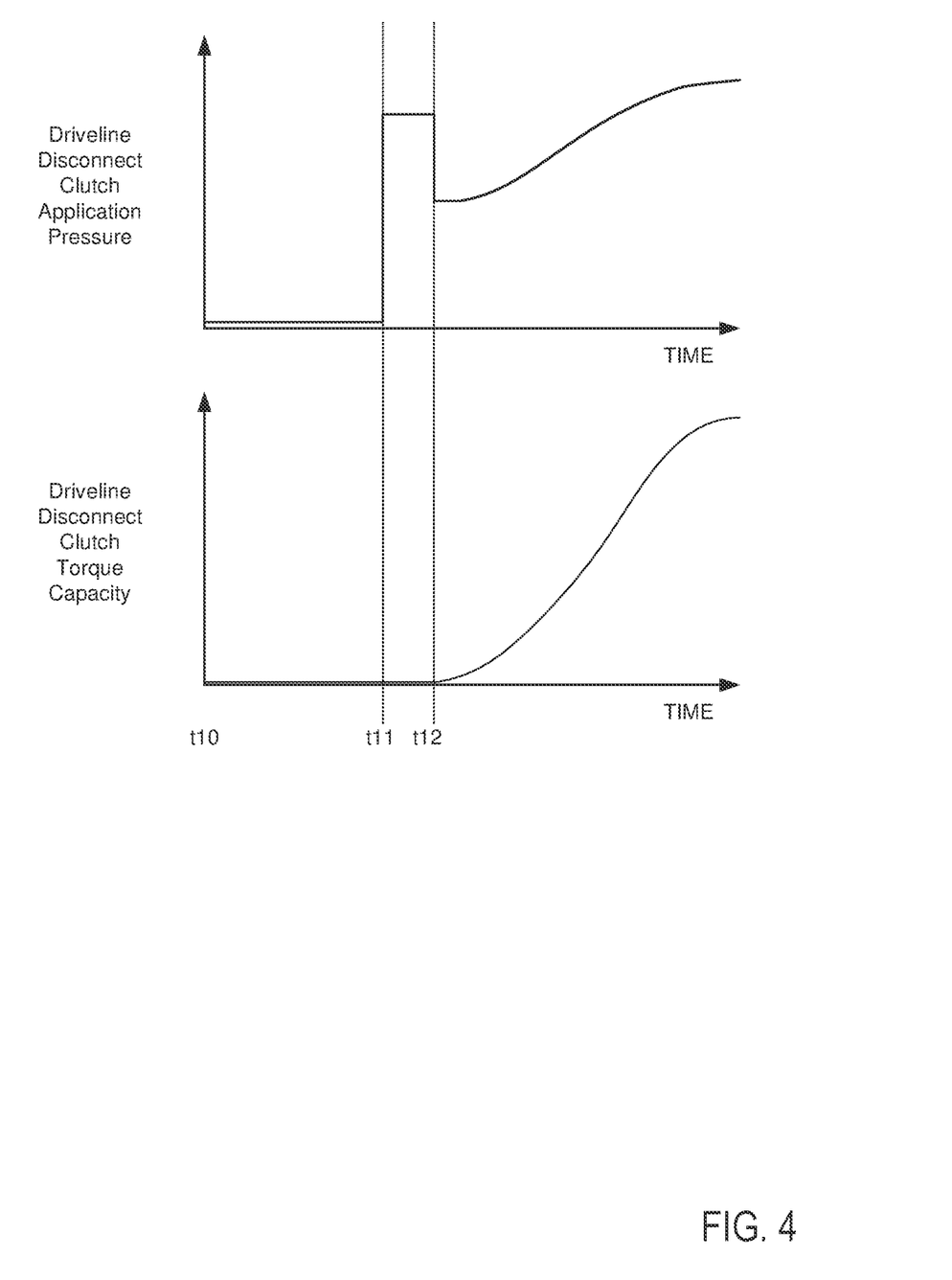
FIG. 4 is plot illustrating driveline disconnect clutch closing pressure control.

The present description is related to improving vehicle operation during conditions when timing of driveline disconnect clutch operation may not meet expectations. For example, if closing of a driveline disconnect clutch is sooner than may be expected, an engine starting procedure may be adjusted to improve vehicle drivability. The vehicle may be a hybrid vehicle that includes an engine as is shown in FIG. 1. The engine of FIG. 1 may be included in a powertrain or driveline as is shown in FIG. 2. The driveline may be operated according to the sequence of FIG. 3 to restart the engine. An example driveline disconnect clutch boost pressure control sequence is shown in FIG. 4. The method of FIG. 5 may be the basis for operating the driveline as is shown in FIG. 3.

A driveline disconnect clutch may be useful for improving vehicle fuel economy and decoupling operation of an engine from operation of an electric machine. However, vehicle drivability may degrade if operational timing of the driveline disconnect clutch is not as expected. In particular, timing of when the driveline disconnect clutch begins to transfer torque and when torque of an electric machine is increased to compensate for torque that is transferred by the driveline disconnect clutch may be important to provide good vehicle drivability and to reduce driveline losses. For example, if vehicle operating conditions are not as accurately reported as may be desired, a lower driveline disconnect clutch capacity may be selected so that insufficient torque to rotate the engine is provided resulting in the engine failing to start. On the other hand, the engine may be rotated to a crankshaft position where the pressure that follows boost pressure is insufficient to crank the engine if boost pressure supplied to the driveline disconnect clutch is greater than may be desired. The increased engine cranking torque may result in a lower engine cranking speed or a longer cranking time, which may be indicative of an expected failed engine start. For at least these reasons, there may be times when operating a driveline disconnect clutch may make vehicle drivability may be less than may be desired.

Strategies for ensuring that driveline disconnect clutch operation and electric machine torque delivery provide smooth driveline operation may include providing adaptable control signal lead and duration compensation for driveline disconnect clutch engagement. However, such strategies may improve coordination between driveline disconnect clutch operation and electric machine operation, but even with this compensation, there may be some misalignment between driveline disconnect clutch operation and electric machine operation. The misaligned operation may be due to part to part variation, component part temperature variation, and/or component degradation.

The inventors herein have recognized the above-mentioned issues and have developed a driveline operating method, comprising: ending a boost phase of a driveline disconnect clutch pressure adjustment via a controller in response to an engine changing state from stopped rotation to rotating.

By cutting a boost phase of a driveline disconnect clutch pressure adjustment short of its scheduled duration in response to an engine changing state from stopped rotation to rotating, it may be possible to provide the technical result of overcoming times when there may be misalignment between a driveline disconnect clutch beginning to close and electric machine torque adjustments for compensating for torque transferred by a driveline disconnect clutch. For example, if an electric machine has insufficient torque to start an engine once a boost pressure is applied to begin a closing process for a driveline disconnect clutch, the boost pressure may be reduced and the engine may be started via an integrated starter/generator or a flywheel starter instead of by the driveline disconnect clutch and the electric machine. As such, the torque transmitted by the driveline disconnect clutch to the engine may be reduced so that vehicle speed may be reduced less than if the engine were started via the electric machine. Thus, a larger driveline torque disturbance may be exchanged for starting the engine an alternative way when boost pressure results in an unexpected rotation of the engine.

The present description may provide several advantages. In particular, the approach may provide improved vehicle drivability. Further, the approach may improve engine starting. Additionally, the approach may be applied whether an engine is started in response to change of mind conditions or after an engine is fully stopped rotating.

The above advantages and other advantages, and features of the present description will be readily apparent from the following Detailed Description when taken alone or in connection with the accompanying drawings.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft.

Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (ISG) 219. ISG 219 may be coupled to crankshaft 40 of engine 10 via a belt 231. Alternatively, ISG 219 may be directly coupled to crankshaft 40. ISG 219 may provide a negative torque to driveline 200 when charging higher voltage electric energy storage device 262 (e.g., a traction battery). ISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an engine; an electric machine; a belt integrated starter/generator; a driveline disconnect clutch positioned between the engine and the electric machine; a transmission coupled to the electric machine; and a controller including executable instructions stored in non-transitory memory that cause the controller to shutdown the engine, and to restart the engine in response to an increase in driver demand before the engine reaches zero speed after the shutdown, the engine restarted via closing the driveline disconnect clutch and rotating the engine with the electric machine when the electric machine has sufficient torque reserved to start the engine, the engine restarted via the belt integrated starter/generator when the electric machine has insufficient torque reserved to start the engine. The system further comprises additional instructions to increase a pressure applied to the driveline disconnect clutch in response to the increase in driver demand. The system further comprises additional instructions to decrease a boost pressure in response to the electric machine having insufficient torque reserved to start the engine. The system further comprises additional instructions to close the driveline disconnect clutch in response to a speed of the engine being within a threshold speed of a speed of the electric machine. The system further comprises additional instructions to increase a pressure applied to the driveline disconnect clutch in response to the electric machine having sufficient torque reserved to start the engine. The system further comprises additional instructions to restart the engine after a speed of the engine is zero. The system includes where the engine is restarted via closing the driveline disconnect clutch and rotating the engine with the electric machine when the electric machine has sufficient torque reserved to start the engine in response to engine cranking speed being less than a threshold speed or an engine cranking time being greater than a threshold amount of time, and where the engine restarted via the belt integrated starter/generator when the electric machine has insufficient torque reserved to start the engine in response to engine cranking speed being less than the threshold speed or the engine cranking time being greater than the threshold amount of time.

Referring now to FIG. 3, a prophetic driveline operating sequence is shown. The driveline operating sequence of FIG. 3 may be provided via the system of FIGS. 1 and 2 in cooperation with the method of FIG. 5. The vertical lines at times t0-t9 represent times of interest during the operating sequence. The plots are time aligned.

The first plot from the top of FIG. 3 is a plot of engine operating state versus time. The vertical axis represents engine operating state (e.g., on—rotating and combusting air and fuel; or off—not combusting air and fuel, but may or may not be rotating). The engine is off when the trace is at a lower level near the horizontal axis. The engine is on when the trace is at a higher level near the vertical axis arrow. The horizontal axis represents time and time increases from the left side of the plot to the right side of the plot. Trace 302 represents engine state.

The second plot from the top of FIG. 3 is a plot of engine rotational speed versus time. The vertical axis represents engine rotational speed and engine rotational speed increases in the direction of the vertical axis arrow. The horizontal axis represents time and time increases from the left side of the plot to the right side of the plot. Trace 304 represents engine rotational speed.

The third plot from the top of FIG. 3 is a plot of pressure that is applied to a driveline disconnect clutch. The pressure that is applied to the driveline disconnect clutch increases in the direction of the vertical axis arrow. The pressure that is applied to the driveline disconnect clutch is zero at the level of the horizontal axis. The horizontal axis represents time and time increases from the left side of the plot to the right side of the plot. Trace 306 represents pressure that is applied to the driveline disconnect clutch.

The fourth plot from the top of FIG. 3 is a plot of driveline integrated starter/generator (e.g., ISG 240) torque versus time. The vertical axis represents ISG torque and ISG torque increases in the direction of the vertical axis arrow. The horizontal axis represents time and time increases from the left side of the plot to the right side of the plot. Trace 308 represents ISG torque. Dashed line 350 represents an amount of ISG torque that is reserved for starting the engine (e.g., a reserved amount of torque for engine starting).

The fifth plot from the top of FIG. 3 is a plot of belt integrated starter/generator (BISG) torque versus time. The vertical axis represents BISG torque and BISG torque increases in the direction of the vertical axis arrow. The horizontal axis represents time and time increases from the left side of the plot to the right side of the plot. Trace 310 represents BISG torque.

The sixth plot from the top of FIG. 3 is a plot of an operator change of mind conditions state versus time. The vertical axis represents operator change of mind state and operator change of mind conditions are present when trace 312 is at a high level near the vertical axis arrow. Operator change of mind conditions are not present when trace 312 is at a low level near the horizontal axis. Operator change of mind conditions being present may include application of a driver demand pedal after an engine is commanded to stop (e.g., fuel injection is stopped or is in the process of stopping) while the engine is rotating. The horizontal axis represents time and time increases from the left side of the plot to the right side of the plot. Trace 312 represents the operator change of mind state.

The seventh plot from the top of FIG. 3 is a plot that indicates which method of starting the engine is selected versus time. The vertical axis represents the selected engine starter state and the ISG is selected to start the engine when trace 314 is at a level that is near the vertical axis arrow. The BISG is selected to start the engine when trace 314 is at a level that is near the horizontal axis. Trace 314 represents the selected engine starting device.

At time t0, the engine is on and running, the drive line disconnect clutch is fully closed as indicated by the application pressure being at a high level. The ISG is operating as a motor and outputting a higher level of torque. The BISG torque output is zero and the operator change of mind is not asserted. No engine starting device is selected. Between time t0 and time t1, the driver demand torque is reduced (not shown).

At time t1, the driver demand torque has been reduced to a level (not shown) where the engine combustion is ceased and the driveline disconnect clutch is opened as indicated by zero driveline disconnect clutch pressure. The ISG torque increases to meet the driver demand torque after combustion in the engine ceases. The BISG torque is zero and an operator change of mind condition is not present. The ISG is selected as the engine starting device.

At time t2, the ISG torque is increased to meet an increasing driver demand torque. The engine rotational speed has not reached zero, so operator change of mind conditions are present. The engine is not activated and the driveline disconnect clutch is open. The selected engine starter switches from ISG to BISG, or an alternative engine starting device, since an operator change of mind is present and since the ISG torque reserve is insufficient to start the engine. The BISG torque is increased so crank and start the engine while the driveline disconnect clutch is open. Using the BISG to start the engine may reduce a possibility of generating a driveline torque disturbance. The engine is not started, but its rotational speed is increased via the BISG.

At time t3, the engine is started and shortly thereafter engine rotational speed is within a threshold speed of ISG speed, so the driveline disconnect clutch is closed as indicated by the higher driveline disconnect clutch pressure. The ISG torque is reduced as the engine begins delivering torque to the driveline. The BISG torque is reduced to zero and the operator change of mind conditions for an engine start are no longer present. No engine starter is selected. Between time t3 and time t4, the engine propels the vehicle and the ISG torque reserved for engine starting is at a higher level.

At time t4, combustion in the engine is stopped a second time in response to a low driver demand torque (not shown). The engine continues to rotate and the driveline disconnect clutch is opened. The ISG is providing a small amount of torque to meet driver demand and the ISG torque reserved for engine starting is sufficient to start the engine. The BISG torque is zero and an operator change of mind is not present. The ISG is selected for engine starting.

At time t5, the driver demand torque is increasing and engine rotational speed is non-zero. Therefore, operator change of mind conditions are present and an operator change of mind is asserted. The driveline disconnect clutch is open, but the pressure that is applied to the driveline disconnect clutch is increased to a boost pressure for starting the engine via the ISG. The ISG torque reserved for engine starting begins declining shortly after time t5 and ISG torque supplied to the driveline is increased shortly after time t5 after the boost pressure is reduced and when driveline disconnect clutch torque capacity begins to increase (not shown). The BISG torque is zero and the selected engine starter remains the ISG. The engine rotational speed begins to increase.

At time t6, the engine is started and the operator change of mind is cleared. The engine rotational speed continues to increase and the pressure applied to the driveline disconnect clutch continues to increase. The ISG torque reserve for engine starting begins to increase after time t6 when the engine starts delivering torque to meet the driver demand (not shown). The BISG torque is zero and the selected engine starter is cleared. Between time t6 and time t7, the engine rotational speed varies and the driveline disconnect clutch remains fully closed. The engine delivers the driver demand torque and the ISG torque output is reduced to zero.

At time t7, the driver demand is reduced to a level that allows the engine to be switched off. The ISG provides torque to meet the driver demand and the driveline disconnect clutch is fully opened as indicated by the low driveline disconnect clutch pressure. The BISG torque is zero and conditions are not present for an operator change of mind engine start. The ISG is selected as the engine starter.

At time t8, the driver demand is high (not shown) enough to generate an engine start request (not shown), which causes an increase in driveline disconnect clutch application pressure to a boost level. The ISG torque is at a higher level to meet driver demand. The ISG torque reserve for engine starting is low and the BISG torque is zero. Operator change of mind conditions are not present and the ISG remains the selected engine starter. The engine rotational speed is zero and the ISG torque is at a higher level.

At time t9, the engine begins to rotate, so the boost pressure that is applied to the driveline disconnect clutch is reduced. Reducing the boost pressure reduces torque transfer through the driveline disconnect clutch. The reducing the boost pressure reduces the driveline disconnect clutch torque capacity so that vehicle speed may not be reduced due to ISG torque being transferred to start the engine. The BISG torque is increased so that the engine may be started. The selected starter is switched from ISG to BISG. Shortly after time t9, the engine is started and the driveline disconnect clutch is fully closed so that the engine may begin to meet the driver demand. The operator change of mind conditions are not present and the selected starter is cleared.

In this way, the ISG or the BISG may be selected as the engine starting device. In addition, if the engine begins to rotate during a boost phase of adjusting pressure that is supplied to the driveline disconnect clutch, the boost pressure may be reduced so that vehicle speed may not fall. Consequently, the possibility of driveline torque disturbances due to driveline disconnect clutch timing issues may be reduced.

Referring now to FIG. 4, an exemplary closing sequence for a driveline disconnect clutch is shown. The driveline disconnect clutch in this example is driveline disconnect clutch 236 shown in FIG. 2.

The first plot from the top of FIG. 4 shows driveline disconnect clutch application pressure versus time. The vertical axis represents driveline disconnect clutch application pressure (e.g., pressure of fluid supplied to close the driveline disconnect clutch). The horizontal axis represents time and time increases from the left side of the plot to the right side of the plot.

The second plot from the top of FIG. 4 shows driveline disconnect clutch torque capacity versus time. The vertical axis represents driveline disconnect clutch torque capacity (e.g., an amount of torque the driveline disconnect clutch may transfer based on the present driveline disconnect clutch application pressure). The horizontal axis represents time and time increases from the left side of the plot to the right side of the plot.

At time t10, the driveline disconnect clutch application pressure is zero. The driveline disconnect clutch is open when the driveline disconnect clutch application pressure is zero. The driveline disconnect clutch may be held open via one or more springs. The driveline disconnect clutch torque capacity is zero at time t10 since the driveline disconnect clutch application pressure is zero.

At time t11, the driveline disconnect clutch application pressure is increased to a predetermined pressure. The predetermined pressure may be a pressure that begins to remove compliance within the driveline disconnect clutch at a desired rate. The driveline disconnect clutch torque capacity is zero while compliance is being removed from the driveline disconnect clutch (e.g., while space between driveline disconnect clutch plates is being reduced). Time t11 is the beginning of the driveline disconnect clutch boost phase.

At time t12, driveline disconnect clutch torque capacity begins to increase and the driveline disconnect clutch application pressure is reduced so that the driveline disconnect clutch does not close faster than is desired. Time t12 is the end of the driveline disconnect clutch boost phase. The amount of time between time t11 and time t12 is the driveline disconnect clutch boost time. The driveline disconnect clutch boost time is the amount of time between when driveline disconnect clutch pressure is increased from a first pressure (e.g., zero gauge pressure) to a predetermined pressure and a time when the driveline disconnect clutch torque capacity begins to increase. After time t12, the driveline disconnect clutch pressure is gradually increased to provide a smooth gradual increase in the driveline disconnect clutch torque capacity.

Figure 5:
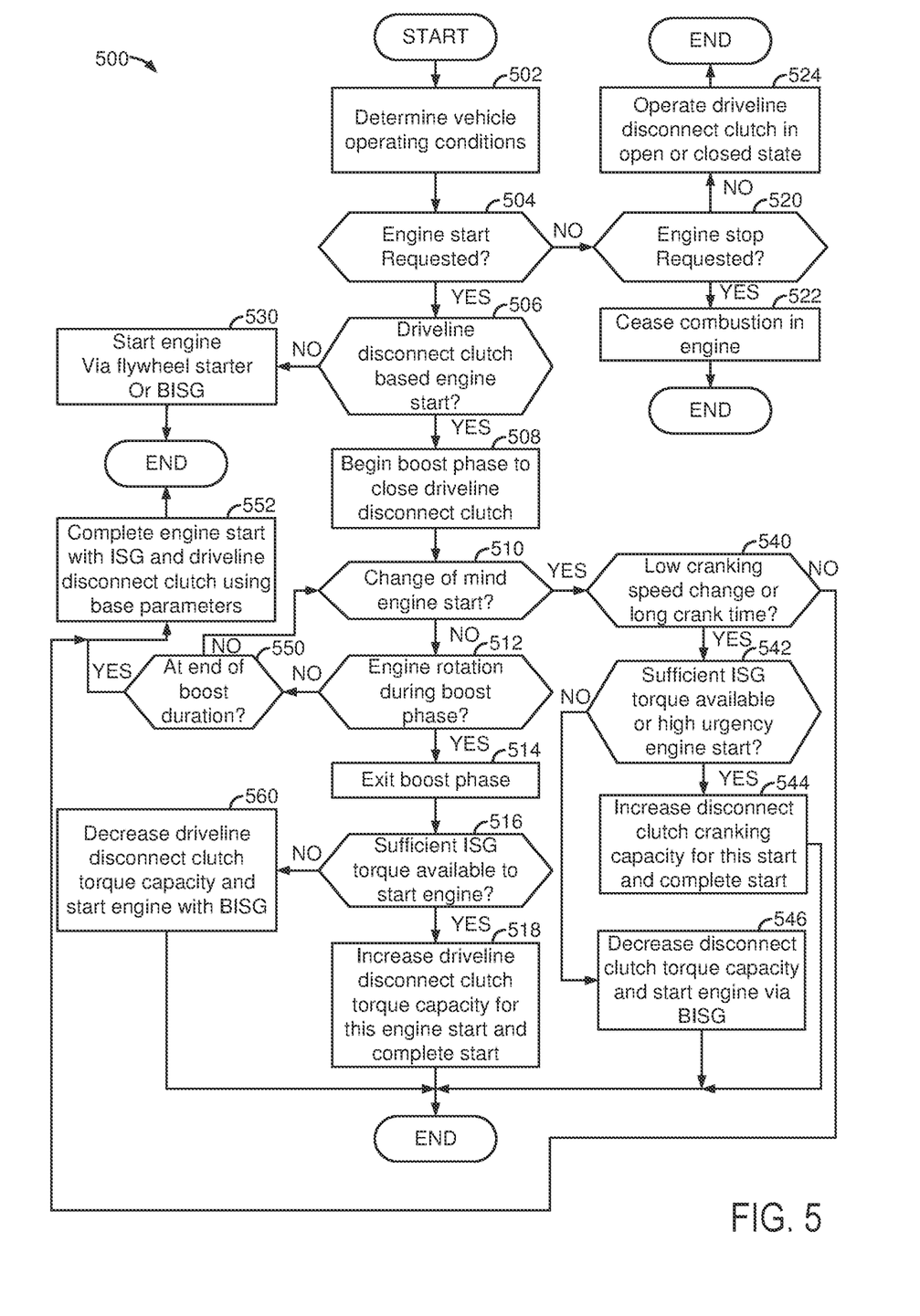
FIG. 5 is a method for operating the hybrid vehicle driveline.

Referring now to FIG. 5, a method for operating a driveline is shown. The method may be at least partially implemented as executable instructions stored in controller memory in the system of FIGS. 1 and 2. Further, the method may include actions taken in the physical world to transform an operating state of the system of FIGS. 1 and 2. Additionally, the method may provide the operating sequence shown in FIG. 3 and it may include instructions for operating the driveline at the conditions described herein.

At 502, method 500 determines vehicle operating conditions. Vehicle operating conditions (e.g., data) may be determined via receiving inputs as shown in FIGS. 1 and 2 into a controller. Vehicle operating conditions may include but are not limited to vehicle speed, present engine operating state (e.g., On/off), engine speed, engine torque, driver demand torque or power, driveline disconnect clutch operating state, miles traveled by the vehicle, transmission operating state, driveline disconnect clutch application pressure, ISG speed, ISG torque, and ambient temperature. Method 500 proceeds to 504 after vehicle operating conditions are determined.

At 504, method 500 judges if an engine start has been requested. The engine start request may be generated via the controller in response to vehicle operating conditions, such as driver demand torque or power and present engine operating state. In other examples, the engine start may be generated in response to human or autonomous driver input, such as via a key switch, pushbutton, or proximity detection device. If method 500 judges that an engine start has been requested, the answer is yes and method 500 proceeds to 506. Otherwise, the answer is no and method 500 proceeds to 520.

At 520, method 500 judges if the engine is to be stopped (e.g., stop combustion within the engine). If so, an engine stop is requested and method 500 proceeds to 522. Otherwise, an engine stop is not requested and method 500 proceeds to 524. Method 500 may judge to stop the engine based on vehicle operating conditions. For example, method 500 may request that the engine be stopped when driver demand torque or power is less than a threshold. Method 500 may include other conditions for stopping the engine, such as battery state of charge, vehicle speed, and catalyst temperature.

At 522, method 500 ceases combustion in the engine via ceasing to supply fuel to the engine. The engine may continue to rotate for a short period after fuel is no longer supplied to the engine. Method 500 may also fully open the driveline disconnect clutch when fuel is no longer supplied to the engine so that the ISG may propel the vehicle while the engine is stopped. Method 500 proceeds to exit after fuel flow to the engine is stopped.

At 524, method 500 continues to operate the engine in its present state. If the engine is combusting fuel and rotating, the engine may continue to combust fuel. If the engine is not supplied with fuel, it may continue without combusting fuel. Method 500 proceeds to exit.

At 506, method 500 judges if the presently requested engine start is to be performed via closing the driveline disconnect clutch and rotating the engine via ISG torque. If so, the answer is yes and method 500 proceeds to 508. Otherwise, the answer is no and method 500 proceeds to 530. Method 500 may judge which starter is to be selected to start the engine based on vehicle operating conditions. For example, if the engine start is predicted to be an urgent start, method 500 may select the driveline disconnect clutch and the ISG to start the engine. If the engine is being started during cold ambient temperatures, method 500 may select the flywheel starter to start the engine.

At 530, method 500 starts the engine via the flywheel starter or the BISG. The flywheel starter or the BISG may rotate the engine while fuel and spark is being supplied to the engine. Method 500 proceeds to exit after the engine is started.

At 508, method 500 begins to increase a pressure of a fluid that is supplied to the driveline disconnect clutch. Method 500 may command a boost pressure of the fluid to reduce compliance within the driveline disconnect clutch so that the driveline disconnect clutch may be closed at a particular time. The boost pressure may be greater than a pressure that is commanded to the driveline disconnect clutch that is being closed when the driveline disconnect clutch begins to increase from zero torque capacity as shown in FIG. 4. The boost pressure may be commanded for a particular duration of time (e.g., 700 milliseconds), which may be referred to as the ISG boost pressure duration. Method 500 proceeds to 510 after the boost pressure is commanded to be delivered to the driveline disconnect clutch.

At 510, method 500 judges if change of mind engine start conditions are present. Change of mind engine start conditions may include the engine not being supplied with fuel, the engine rotating, and an increasing driver demand. If method 500 judges that change of mind engine start conditions are present, the answer is yes and method 500 proceeds to 540. Otherwise, the answer is no and method 500 proceeds to 512. If change of mind engine start conditions are present, method 500 may supply a predetermined boost pressure to the driveline disconnect clutch for a predetermined duration. Method 500 may supply pressure to the driveline disconnect clutch according to a profile that is stored in controller memory after the predetermined boost pressure has been applied to the driveline disconnect clutch for the predetermined amount of time. Thus, the pressure may be reduced from the boost pressure and then increased as shown in FIG. 4.

At 512, method 500 judges if the engine has started rotating during the boost phase of supplying pressure to the driveline disconnect clutch. Method 500 may monitor the engine's position to determine whether or not the engine has moved. If method 500 judges that the engine has started to move during the boost phase of supplying pressure to the driveline disconnect clutch, the answer is yes and method 500 proceeds to 514. Otherwise, the answer is no and method 500 proceeds to 550.

At 514, method 500 exits the boost phase of supplying pressure to the driveline disconnect clutch by reducing the pressure of fluid that is supplied to the driveline disconnect clutch. In one example, the pressure of fluid supplied to the driveline disconnect clutch may be reduced to less than 5% of the maximum pressure that may be delivered to the driveline disconnect clutch. For example, if a maximum pressure of 100 kilopascals may be delivered to the driveline disconnect clutch, the pressure supplied to the driveline disconnect clutch may be reduced to less than 5 kilopascals. Thus, the boost pressure supplied to the driveline disconnect clutch may be reduced in response to engine rotation. The boost pressure may be reduced because timing of engine rotation and increasing driveline disconnect clutch torque capacity may not be aligned with ISG torque adjustments to rotate the engine. Note that the boost phase of increasing pressure supplied to the driveline disconnect clutch is intended to reduce compliance within the driveline disconnect clutch before the driveline disconnect clutch begins to transfer torque. Therefore, reducing the boost pressure to exit the boost phase if the engine begins to rotate may reduce the possibility of a driveline torque disturbance. Method 500 proceeds to 516.

At 516, method 500 judges if the ISG has sufficient torque capacity reserved to start the engine. In one example, method 500 may estimate torque to start the engine via a function or table that is referenced or indexed via engine temperature, the altitude the engine is at, and ambient temperature. In some examples, method 500 may reserve ISG torque based on the estimated amount of torque required to start the engine. For example, the engine may require 70 Newton-meters (Nm) to crank the engine during engine starting, the ISG may have a maximum torque output of 240 Nm at the present conditions, and the ISG may be providing 120 Nm to propel the vehicle. Thus, 120 Nm of torque capacity of the ISG is not presently utilized (240−120=120), and if 70 Nm of ISG capacity is reserved for engine starting, the answer is yes and method 500 proceeds to 518. Otherwise, the answer is no and method 500 proceeds to 560.

At 560, method 500 decreases the torque capacity (e.g., amount of torque that the driveline disconnect clutch may transfer) of the driveline disconnect clutch and starts the engine via rotating the engine via the BISG or an alternative engine starting device (e.g., flywheel starter 96). The driveline disconnect clutch torque capacity may be reduced to a level that is insufficient to rotate the engine via the ISG. The BISG or alternative engine starting device rotates the engine at a cranking speed (e.g., 250 RPM) and fuel and spark are supplied to the engine. Once the engine starts, it may be accelerated to a speed of the ISG. When speed of the engine is within a threshold speed of the ISG speed, method 500 may lock the driveline disconnect clutch so that the engine rotates at a same speed as the ISG. The engine may begin delivering power to the driveline. Method 500 proceeds to exit.

At 518, method 500 increases the torque capacity (e.g., amount of torque that the driveline disconnect clutch may transfer) of the driveline disconnect clutch and starts the engine via rotating the engine via the ISG. The driveline disconnect clutch torque capacity may be increased to a level that is sufficient to rotate the engine via the ISG without the driveline disconnect clutch being locked and having zero slip. The ISG rotates the engine at a cranking speed (e.g., 250 RPM) and fuel and spark are supplied to the engine. Once the engine starts, it may be accelerated to a speed of the ISG. When speed of the engine is within a threshold speed of the ISG speed, method 500 may lock the driveline disconnect clutch so that the engine rotates at a same speed as the ISG. The engine may begin delivering power to the driveline. Method 500 proceeds to exit.

At 550, method 500 judges if the pressure during the boost phase of closing the driveline disconnect clutch is at an end of the boost duration. The boost phase may last a predetermined amount of time (e.g., the boost duration) that may be retrieved from controller memory. If method 500 judges that a boost level pressure of fluid has been supplied to the driveline disconnect clutch for an amount of time that is equal or greater than the boost duration, the answer is yes and method 500 proceeds to 552. Otherwise the answer is no and method 500 returns to 510. Thus, if the boost duration is 750 milliseconds and boost pressure has been applied to the driveline disconnect clutch for 500 milliseconds, the answer is no and method 500 returns to 510. However, if the boost duration is 750 milliseconds and boost pressure has been applied to the driveline disconnect clutch for 751 milliseconds, the answer is yes and method 500 proceeds to 552.

At 552, method 500 completes the engine starting by closing the driveline disconnect clutch and rotating the engine via the ISG. In addition, method 500 supplies fuel and spark to the engine. Method 500 may complete the engine start according to baseline engine starting parameters for starting the engine via the ISG and the driveline disconnect clutch. For example, method 500 may reduce a pressure that is applied to the driveline disconnect clutch and then gradually increase pressure that is supplied to the driveline disconnect clutch. The driveline disconnect clutch pressure may follow a predetermined profile that is stored in controller memory. Method 500 proceeds to exit after the engine is started.

At 540, method 500 judges if the engine's rate of change of rotational engine speed during engine cranking is less than a threshold speed or if the engine has been cranking (e.g., rotating under power of the ISG) for longer than a threshold amount of time. If not, the answer is no and method 500 proceeds to 552. Otherwise, the answer is yes and method 500 proceeds to 542. The low rate of engine speed change, low engine cranking speed, and long cranking duration may be indicative of a degraded engine start, which may be mitigated via starting the engine via a second engine starting device or an alternative approach.

At 542, method 500 judges if the ISG has sufficient torque capacity reserved to start the engine or if the engine start is an urgent engine start. Urgent engine starts may occur when a rate of driver demand increases above a threshold rate. If method 500 judges that the ISG has sufficient torque capacity to start the engine or if the engine start is urgent, the answer is yes and method 500 proceeds to 544. Otherwise, the answer is no and method 500 proceeds to 546.

At 546, method 500 decreases the torque capacity of the driveline disconnect clutch and starts the engine via rotating the engine via the BISG or another device (e.g., the flywheel starter 96). The driveline disconnect clutch torque capacity may be reduced to a level that is insufficient to rotate the engine via the ISG. The BISG or alternative starter rotates the engine at a cranking speed (e.g., 250 RPM) and fuel and spark are supplied to the engine. Once the engine starts, its speed may be adjusted to a speed of the ISG. When speed of the engine is within a threshold speed of the ISG speed, method 500 may lock the driveline disconnect clutch so that the engine rotates at a same speed as the ISG. The engine may begin delivering power to the driveline. Method 500 proceeds to exit.

At 544, method 500 increases the torque capacity (e.g., amount of torque that the driveline disconnect clutch may transfer) of the driveline disconnect clutch and starts the engine via rotating the engine via the ISG. The driveline disconnect clutch torque capacity may be increased to a level that is sufficient to rotate the engine via the ISG without the driveline disconnect clutch being locked and having zero slip. The ISG rotates the engine at a cranking speed (e.g., 250 RPM) and fuel and spark are supplied to the engine. Once the engine starts, it may be accelerated to a speed of the ISG. When speed of the engine is within a threshold speed of the ISG speed, method 500 may lock the driveline disconnect clutch so that the engine rotates at a same speed as the ISG. The engine may begin delivering power to the driveline. Method 500 proceeds to exit.

In this way, the selection of an engine starting device may be made. Further, if boost pressure causes the driveline disconnect clutch to rotate the engine before engine rotation may be expected, mitigating measures may be taken to reduce a possibility of a driveline torque disturbance that may result from transferring torque across the driveline disconnect clutch before ISG torque is adjusted to compensate for the transferred torque.

Thus, the method of FIG. 5 provides for a driveline operating method, comprising: ending a boost phase of a driveline disconnect clutch pressure adjustment via a controller in response to an engine changing state from stopped rotation to rotating. The method includes where the boost phase is generated in response to an engine start request. The method further comprises increasing torque capacity of a driveline disconnect clutch in response to a sufficient amount of available torque of an electric machine to start the engine following ending the boost phase. The method further comprises decreasing a torque capacity of a driveline disconnect clutch in response to an insufficient amount of available torque of an electric machine following ending the boost phase. The method further comprises starting the engine via a belt integrated starter/generator in response to the insufficient amount of available torque of the electric machine. The method further comprises closing the driveline disconnect clutch in response to a speed of the engine being within a threshold speed of the electric machine. The method further comprises not ending the boost phase in response to the engine not changing state from stopped rotation to rotating during the boost phase. The method further comprises starting the engine via closing a driveline disconnect clutch and rotating the engine via an electric machine.

The method of FIG. 5 also provides for a driveline operating method, comprising: increasing a driveline disconnect clutch torque capacity in response to a torque reserve of an electric machine being sufficient to start an engine when change of mind conditions are present after an engine shutdown; and decreasing a boost pressure and starting the engine via an alternative engine starting device in response to the torque reserve of the electric machine being insufficient to start the engine when the change of mind conditions are present after the engine shutdown. The method includes where the change of mind conditions are an increasing driver demand and a non-zero engine speed, and where the alternative engine starting device is a belt integrated starter/generator or a flywheel starter. The method further comprises closing a driveline disconnect clutch in response to engine speed being within a threshold speed of an electric machine after decreasing the boost pressure in response to the torque reserve of the electric machine being insufficient to start the engine when the change of mind conditions are present after the engine shutdown. The method includes where the engine shutdown includes ceasing to supply fuel to the engine. The method includes where the driveline disconnect clutch torque capacity is increased via increasing a pressure of a fluid supplied to a driveline disconnect clutch.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method, comprising:
   beginning a boost phase of a driveline disconnect clutch pressure adjustment in response to an engine start request;
   ending the boost phase of the driveline disconnect clutch pressure adjustment via a controller in response to an engine changing state from stopped rotation to rotating.

2. The driveline operating method of claim 1, further comprising adjusting a pressure applied to a driveline disconnect clutch to follow a predetermined profile in response to the driveline disconnect clutch pressure adjustment being at an end of the boost phase without the engine rotating.

3. The driveline operating method of claim 2, further comprising supplying spark and fuel to the engine in response to the driveline disconnect clutch pressure adjustment being at the end of the boost phase without the engine rotating.

4. The driveline operating method of claim 1, determining the presence or absence of vehicle operating conditions that are indicative of an operator change of mind.

5. The driveline operating method of claim 4, further comprising increasing a torque capacity of a driveline disconnect clutch in response to a low engine cranking speed.

6. The driveline operating method of claim 4, further comprising decreasing a torque capacity of a driveline disconnect clutch and cranking the engine via a belt integrated starter generator in response to insufficient integrated starter generator torque to start the engine.

7. The driveline operating method of claim 4, where the vehicle operating conditions that are indicative of an operator change of mind include an unfueled rotating engine and increasing driver demand.

8. The driveline operating method of claim 7, further comprising supplying a predetermined boost pressure to a driveline disconnect clutch for a predetermined amount of time in response to a presence of the vehicle operating conditions that are indicative of the operator change of mind.

9. The driveline operating method of claim 4, further comprising increasing a torque capacity of a driveline disconnect clutch in response to a high urgency engine start.

10. The driveline operating method of claim 9, where the high urgency engine start is based on a rate of driver demand being greater than a threshold.

* * * * *